Feb. 13, 1940.          R. I. HUFFMAN          2,190,361
HANDLE STRUCTURE FOR SADIRONS AND THE LIKE
Filed April 11, 1938
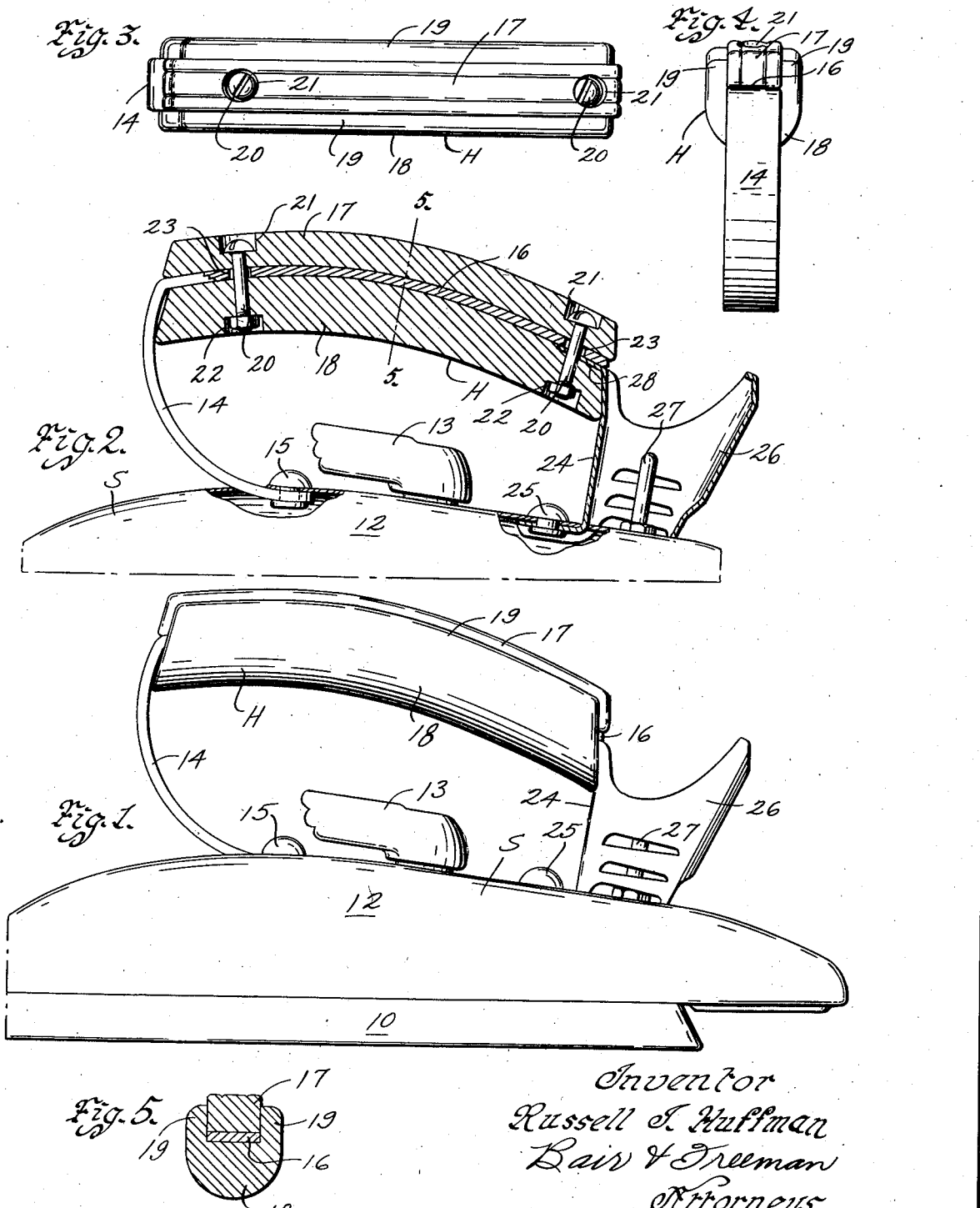
Inventor
Russell I. Huffman
Bair & Freeman
Attorneys Patented Feb. 13, 1940

2,190,361

UNITED STATES PATENT OFFICE 2,190,361

HANDLE STRUCTURE FOR SADIRONS AND THE LIKE

Russell I. Huffman, Dover, Ohio, assignor to Knapp-Monarch Company, St. Louis, Mo., a corporation of Missouri Application April 11, 1938, Serial No. 201,389

2 Claims. (Cl. 38—90)

An object of my invention is to provide a simple and inexpensively manufactured and assembled handle structure particularly adapted for sadirons.

A further object is to provide a handle structure consisting of a handle bow of strap iron or the like and a handle for the bow which consists of a pair of handle elements on opposite sides of the handle portion of the bow and means to secure them in position thereon.

Still a further object is to provide a handle member in the form of a pair of handle elements for contact with opposite faces of a handle bow, one of the handle elements being channel-shaped for receiving the handle portion of the handle bow and embracing opposite side edges of the other handle element whereby the complete handle member entirely encloses the handle portion of the bow.

With these and other objects in view my invention consists in the construction, arrangement and combination of the various parts of my handle structure whereby the objects contemplated are attained, as hereinafter more fully set forth, pointed out in my claims and illustrated in the accompanying drawing. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in my drawing, wherein:

Figure 1 is a side elevation of a sadiron with my improved handle structure mounted thereon.

Figure 2 is a longitudinal sectional view through the handle and portions of the iron showing the construction of the handle and the attachment thereof to the iron.

Figure 3 is a plan view of the handle per se;

Figure 4 is a front elevation thereof; and

Figure 5 is a sectional view on the line 5—5 of Figure 2.

On the accompanying drawing I have used the reference character S to indicate generally a sadiron. The sadiron S includes a sole plate 10 and a shell 12. My handle structure is indicated generally at H. It comprises a handle bow having at its front end a supporting portion 14 and extending rearwardly from the supporting portion, a handle portion 16. The supporting portion 14 is adapted to be secured to the sadiron S in any suitable manner. By way of illustration I show a rivet 15 which secures the handle bow to the shell 12 of the sadiron.

On the handle portion 16 I provide a handle member comprising two separate handle elements 17 and 18. The handle bow is preferably formed of inexpensive material such as strap iron and the handle portion 16 thereof is somewhat curved as it is desirable to have the handle elements 17 and 18 formed on a curvature for comfort of the user when grasping the handle of the iron.

The handle element 17 is substantially rectangular in cross section as shown in Figure 5, while the handle element 18 is channel-shaped. The channel shape of the handle element 18 provides flanges 19 which enclose the side edges of the handle portion 16 of the handle bow and embrace the side edges of the handle element 17. Thus the metal handle portion 16 is entirely enclosed by the handle members 17 and 18 which are formed of wood or other suitable insulating material and thereby minimize the transmission of heat from the metallic supporting portion 14 of the handle bow to the hand of the user.

For securing the handle elements 17 and 18 in position on the handle bow, I provide bolts 20. The heads and nuts of the bolts are preferably countersunk in sockets 21 and 22 of the handle members 17 and 18 as illustrated in Figure 2. This prevents transmission of heat from the bolts to the hand of the user. As a further means to minimize such transmission of heat, the handle portion 16 of the handle bow may have enlarged openings 23 for the bolts 20 whereby to avoid metallic contact between the handle bow and the bolts.

For supporting the rear end of the handle bow I provide a supporting plate 24. The plate 24 may be riveted to the shell 12 as by rivet 25 and may be formed of sheet metal. The plate 24 may also include a protector member 26 for the terminal prongs 27 of the sadiron. The plate 24 has a flange 28 which is interposed between the handle portion 16 of the handle bow and the handle element 18. The handle of the iron is thereby supported at its rear end after the rear bolt 20 is assembled in position and tightened.

My structure eliminates the necessity of providing a long tie bolt threaded through the bow of a sadiron handle, eliminates any possibility of rotation of the handle relative to the handle bow and provides within the handle member a rigid reinforcement against bending of the handle whenever the iron is dropped on the floor. All of these advantages are obtained with my structure which is very inexpensive to manufacture.

Some changes may be made in the construction and arrangement of the parts of my handle structure without departing from the real spirit and purpose of my invention. I therefore intend to cover by my claims such modified forms of structure or use of mechanical equivalents as may be reasonably included within their scope.

I claim as my invention:

1. In a handle structure, a handle bow having a flat handle portion and a supporting portion at one end thereof and a handle member for said handle portion comprising a pair of handle elements on opposite faces of said handle portion, bolts extending through said handle elements and said handle portion to retain said parts assembled together and a supporting member for said other end of said handle bow having a flange retained between one of said handle elements and said handle portion of said handle bow by one of said bolts.

2. In a handle structure, a handle member comprising a pair of handle elements, bolts extending through said handle elements to retain them assembled together, and means for mounting said handle member comprising a handle bow and a supporting member, said handle bow having a handle portion received and retained between said handle elements and a supporting portion at one end of said handle member, and said supporting member being provided for the other end of said handle member and having a flange received and retained between said handle elements thereof.

RUSSELL I. HUFFMAN.